A. Whiteley,
Mower.
No. 12,768.    Patented. April. 24. 1855.
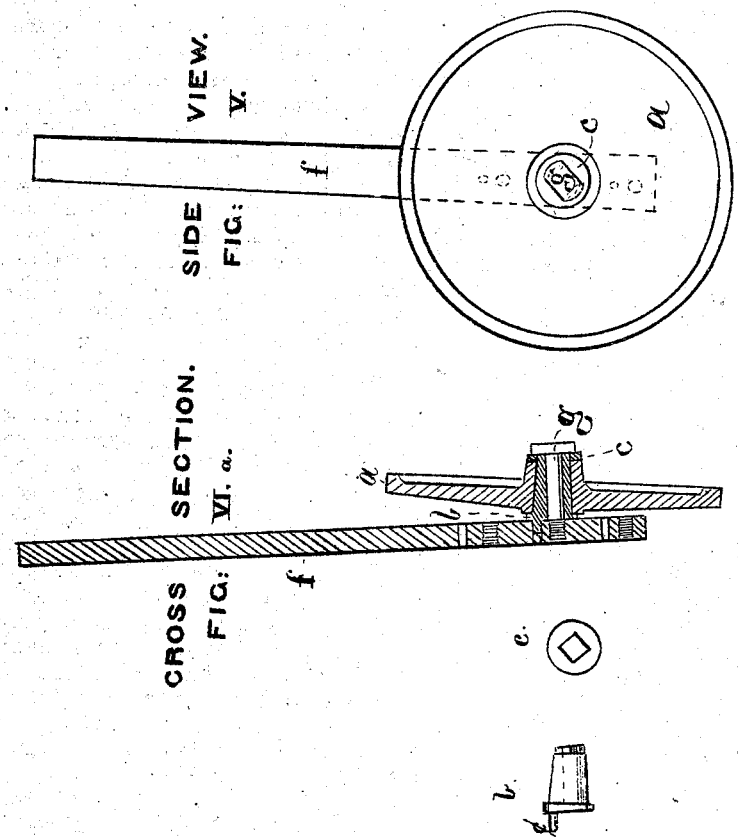

UNITED STATES PATENT OFFICE.

ABNER WHITELEY, OF SPRINGFIELD, OHIO.

IMPROVEMENT IN ATTACHING WHEELS TO HARVESTERS AND OTHER MACHINES.

Specification forming part of Letters Patent No. 12,768, dated April 24, 1855.

*To all whom it may concern:*

Be it known that I, ABNER WHITELEY, of Springfield, in the county of Clarke and State of Ohio, have invented a new and useful improvement in axles to grain-wheels of reaping-machines, and also in axles to wheels of other machines, and securing the wheels on said axles, also attaching said axles to said machines; and I do hereby declare that the following is a full, clear, and exact description of the same, reference being had to the accompanying drawings, making part of this specification.

This improvement admirably combines giving the wheel the necessary pitch and gather, securing the wheel on its axle, and attaching the axle to the machine by means of a single screw-bolt, and by the withdrawal of which, when attached to a reaping-machine, grain-drill, or wheel-cultivator, the same is changed to a different height without risk or danger to the operator, consequent of other modes of attaching this wheel to the machine.

In the accompanying drawings, of which Figure V is a side view, and Fig. VI a cross-section, *b* is the axle, made in the following manner: That part which occupies the bore or hole in the hub of the wheel *a*, I generally make tapering in proportion as I want the wheel to have pitch—*i. e.*, the more pitch the wheel is to have the more tapering I make that part of the axle; and on the larger end of said axle I make a shoulder or collar sufficiently large and thick for said wheel to run against, and it will be seen that the axle extends through the hub, and that part which projects is made square to receive the washer *c*, which has a square hole in it, made to fit the square end of said axle, and when fitted on I rivet it slightly to prevent its dropping off when the screw-bolt *g* is withdrawn. The planes of the ends of said axle, with the washer on, I make parallel to each other, and oblique to the center of said axle when I want the wheel to stand inclined to the plane of the horizon, and at the same angle to the center of said axle as I want the wheel to have to the horizontal line. Then I drill a hole lengthwise through said axle, at right angles to the planes of the ends of said axle, through which the bolt *g* passes and projects beyond the end of said axle, and that part which projects has a screw-thread cut on it which is fitted to the holes in the plate *f*, which have screw-threads cut in them, and by driving said bolt into any one of said holes until it brings the plane of the larger end of said axle tight against the plate *f*. The plane of the larger end of said axle being the whole size of the axle and collar gives it a large bearing-surface on the plate *f*, and the hole through which the bolt *g* passes being near the center of said plane. Now it will be seen that when the said plane is brought tight against the plate *f* by means of the bolt *g* the large bearing-surface of said plane on the plate *f* will prevent said axle giving or bending in any direction, thus giving it great strength without any portion of said axle extending into said plate, except the stud *e*; and it is only necessary for the end of the bolt *g* to extend to the inside of the plate *f* to give all necessary strength to said axle, thus requiring only the plate *f*, which in the full-sized machine is one-half inch thick, and the collar about one-fourth of an inch thick, making about three-fourths of an inch in all that is occupied between the wheel *a* and open space in the machine, thus enabling me in the reaping-machine to extend the end of the rake closer up to the wheel than I could otherwise do, and also enables me in the right-angled reaping-machine to extend the reel-rods close up to the whole plane of the wheel *a* and bring in the grain that would otherwise come in front of the wheel-post and could not be brought in by the reel. The same space is left in the grain-drill for the seed-slide and other fixtures to work in, the wheel and axle become attached firmly to the machine, the axle *b* being held firmly between the head of the bolt *g* and plate *f*, and the wheel *a* being secured on the axle by means of washer *c* (which washer, it will be seen, prevents the hub of the wheel *a* from acting on the head of the bolt *g* to tighten or loosen it when the machine is put in motion) and head of bolt *g*, which head extends over the end of the axle and secures the washer *c*, the tapering part of the axle *b* being a little longer than the hub of the wheel *a*, so as to give the hub of the wheel *a* end play on the axle *b*. *e*, the stud in the plane of the larger end of said axle *b*, enters any of the holes seen in the plate *f*, just above those having the screw-thread in them, and is used to prevent said axle *b* from revolving on the bolt *g*. The plate *f*, I secure to the machine in any suitable manner, inclining the front edge of said plate toward the center of the space in front of the machine, so as to give the wheel, when attached, the desired gather.

The operation of said wheel and axle is as follows: When said wheel and axle are secured together, as described, and the stud $e$ is made to enter any of the holes in the plate $f$, as described, I pass the bolt $g$ through the hole in the axle $b$ until it reaches the hole in the plate $f$. I then turn said bolt $g$ with a wrench until the head of said bolt is brought tight against the washer $c$ and the small end of the axle $b$, and the plane of the larger end of said axle $b$ is brought and held tight against the face of the plate $f$. Now it will be seen that the operator to change the height of the machine has only to withdraw the bolt $g$ to detach said wheel and axle, which he does when standing outside of the machine, and raises or lowers the wheel and axle to any other set of holes desired, and drives said bolt in, as before described, with his wrench, all the time standing outside of the machine, where, if the team starts, he would be in no danger, such as the operator is exposed to in other modes of attaching said wheel, where he is obliged to go into said machine and do most of the work of attaching and detaching, when, if the team should start suddenly to run off, it would endanger his life. Besides this, it will be discovered there will be a great saving of labor by this mode, and when the machine is drawn forward it will be seen that the wheel operates in the same manner in supporting the side of the machine as any other wheels used for similar purposes.

What I claim as my invention, and desire to secure by Letters Patent, is—

The simultaneous attachment of the wheel $a$ to or on the axle $b$, and the axle $b$ to the plate $f$ by means of the bolt $g$, in combination respectively with the stud $e$ and washer $c$, as described.

ABNER WHITELEY.

Witnesses:
JOHN W. MANKIN,
SAML. GRUBB.